(No Model.)

F. H. WILKS.
LAWN EDGE TRIMMER.

No. 583,134. Patented May 25, 1897.

Witnesses
C. O. Mason
S. E. Bain

Inventor
Frank H. Wilks
by H. M. Mason atty.

THE NORRIS PETERS CO., PHOTO-LITHO., WASHINGTON, D. C.

UNITED STATES PATENT OFFICE.

FRANK HENRY WILKS, OF NEWPORT, RHODE ISLAND, ASSIGNOR OF ONE-HALF TO H. WALLACE BRIGGS, OF SAME PLACE.

LAWN-EDGE TRIMMER.

SPECIFICATION forming part of Letters Patent No. 583,134, dated May 25, 1897.

Application filed June 25, 1896. Serial No. 596,934. (No model.)

*To all whom it may concern:*

Be it known that I, FRANK HENRY WILKS, a citizen of the United States, residing at Newport, in the county of Newport and State of Rhode Island, have invented a new and useful Device for Trimming the Grass Along the Edges of a Lawn or the Border of a Walk, which device I call a "Lawn-Edge Trimmer," of which the following is a specification.

The object of my invention is to produce a device by means of which the grass on the edge of a lawn may be trimmed more easily and expeditiously than by the ordinary trimming-shears which are operated by hand.

The accompanying drawings illustrate my invention, in which—

Figure 1:
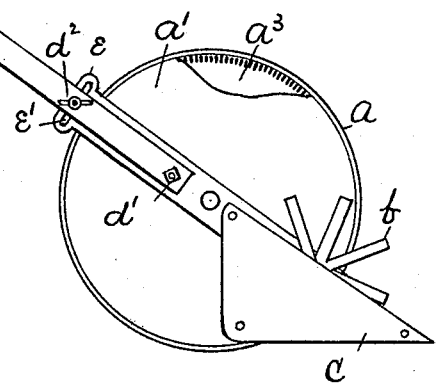
Figure 2:
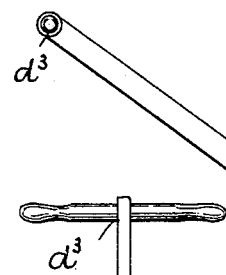
Figure 3:
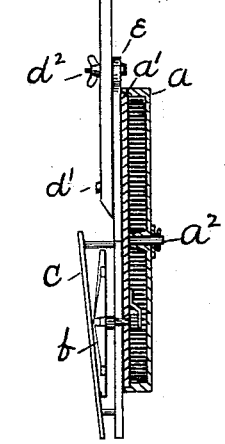
Figure 3:
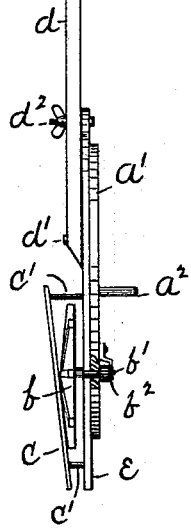

Figure 1 is a side view showing a portion of the covering-disk broken away in order to show the construction of the drive-wheel. Fig. 2 is a front view showing the drive-wheel in vertical section. Fig. 3 is a front view showing the drive-wheel removed.

Similar letters refer to similar parts in the several views.

The letter $a$ indicates the drive-wheel of my device, which is mounted on a shaft $a^2$, projecting from the covering-disk $a'$.

$b$ is a rotary cutter mounted on a shaft $b'$, which is journaled in the covering-disk $a'$ and has secured to it the spur-gear $b^2$, which is adapted to mesh with the inwardly-projecting cogs $a^3$ of the drive-wheel $a$.

$e$ is a bar preferably formed integrally with the covering-disk $a'$ and projecting to the front beyond the periphery of the drive-wheel, so as to form a guard for the rotary cutter, and also projecting to the rear beyond the periphery of the drive-wheel, where it is provided with a transverse slot $e'$.

$c$ is a cutting-bar secured to the studs $c'$, which project from the bar $e$, close against which bar the cutter $b$ revolves.

$d$ is the handle-bar of the device pivoted to the bar $e$ at $d'$ and adjustable as to height by means of a bolt and thumb-nut $d^2$ and the slot $e'$.

The device is designed to be pushed in front of the operator by the handle $d^3$.

In order to prevent the clogging of the device, the face of the cutter $b$ is preferably made slightly conical, as shown in Figs. 2 and 3, and the cutter-bar $c$ is set at a corresponding angle, so that the front of said cutter may revolve closely against it.

The grass on the edge of a lawn or the border of a walk projects horizontally, and as this device is pushed along the edge of said lawn the grass is gathered between the point of the cutting-bar $c$ and the arms of the rotary cutter $b$ and thereby cut off.

Having thus described my invention, what I claim, and desire to secure by Letters Patent, is—

A lawn-edge trimmer, consisting of the covering-disk $a'$, having the bar $e$, projecting beyond its periphery to form a guard for the cutter, and a connection for the handle-bar, and provided with the shaft $a^2$, and having the shaft $b'$, carrying the spur-gear $b^2$, journaled therein; the drive-wheel $a$, having inwardly-projecting cogs $a^3$, mounted on the shaft $a^2$, and adapted to mesh with the spur-gear $b^2$; the cutter-bar $c$, mounted on the studs $c$, projecting beyond the periphery of the covering-disk and forming a guard for the lower half of the cutter, and arranged at an acute angle with the plane of the covering-disk $a'$; and the cutter $b$, mounted on the shaft $b'$, between the front projection of the bar $e$, and the cutter-bar $c$, having its cutting-face slightly conical to correspond with the angular arrangement of the cutter-bar, and adapted to revolve closely against it, as and for the purpose specified.

FRANK HENRY WILKS.

Witnesses:
   JAMES MATSON,
   OLIVER WISE.